US006775422B1

(12) United States Patent
Altman (10) Patent No.: US 6,775,422 B1
(45) Date of Patent: *Aug. 10, 2004

(54) SYSTEMS, PROCESSES, AND PRODUCTS FOR STORAGE AND RETRIEVAL OF PHYSICAL PAPER DOCUMENTS, ELECTRO-OPTICALLY GENERATED ELECTRONIC DOCUMENTS, AND COMPUTER GENERATED ELECTRONIC DOCUMENTS

(75) Inventor: Gerald Altman, Newton, MA (US)

(73) Assignee: Papercomp, Inc., Newton, MA (US)

( * ) Notice: Subject to any disclaimer, the term of this patent is extended or adjusted under 35 U.S.C. 154(b) by 587 days.

This patent is subject to a terminal disclaimer.

(21) Appl. No.: 09/665,188

(22) Filed: Sep. 17, 2000

Related U.S. Application Data (63) Continuation-in-part of application No. 08/882,833, filed on Jun. 26, 1997, now Pat. No. 6,236,767.
(60) Provisional application No. 60/020,902, filed on Jun. 27, 1996.

(51) Int. Cl.[7] ................................................. G06K 9/54
(52) U.S. Cl. ....................... 382/305; 358/402; 358/403; 382/321; 707/2; 707/10; 707/200
(58) Field of Search .............................. 382/305–306, 382/312, 321; 707/1–10, 100, 102, 200, 204, 205; 358/402–404, 474

(56) References Cited

U.S. PATENT DOCUMENTS

| | | | | |
|---|---|---|---|---|
| 6,236,767 B1 | * | 5/2001 | Altman | 382/305 |
| 6,396,964 B1 | * | 5/2002 | Altman | 382/306 |
| 6,456,747 B2 | * | 9/2002 | Altman | 382/305 |

* cited by examiner

*Primary Examiner*—Bhavesh M. Mehta
*Assistant Examiner*—Gregory Desire
(74) *Attorney, Agent, or Firm*—Altman & Martin (57) ABSTRACT

A storage system is provided for paper and electronic documents. Electronic documents include electronic image documents and electronic work documents, which may be completely unrelated in form or content, are acquired or produced to provide one or more real time sequences of electronic documents in one or more real time sequences of date/time instances. Acquired or produced physical documents, for ultimate convenience, simply are added to the front (or the back) of one or more cumulative physical stack. The resulting electronic records of a database, with assured precision, uniquely identify the physical locations of the physical documents and the electronic locations of the electronic documents, both in terms of their associated date/time instances. In effect, these date/time instances guarantee that virtual sets of related physical documents may be conveniently accessed and physically retrieved, and that corresponding sets of related electronic documents may be immediately displayed and suitably presented.

47 Claims, 9 Drawing Sheets

TABLE 1

| Entry_Date/Time | Entity_Code | Project_No | Doc_Image/Text | Doc_Publish_Date | Doc_Author/Source | Subject_Matter | Doc_Whole/Part | Account_Location | Doc_View |
|---|---|---|---|---|---|---|---|---|---|
| | | | | | | | | | |
| | | | | | | | | | |
| | | | | | | | | | |

Entry Date/Time of scan or text - yy/mm/dd/hh/nn/ss data type

Electronic Image or text documents - OLE object linking/embedding data type

Fig. 11

TABLE 2

| Entity_Code | Entity_Name | Entity_Address | Entity_Info | Entity_Tel_No | Entity_Fax_No | Entity_Email | Reference_Code | Reference_Kind | Reference_Info |
|---|---|---|---|---|---|---|---|---|---|
| | | | | | | | | | |
| | | | | | | | | | |
| | | | | | | | | | |

Primary field in Table 2
Secondary field in Table 1

Fig. 12

Table 3

| Project_No | Project_Kind | Project_Name | Security_Level | Archive_Term Date/Time | Task_Entry_Date/Time | Task_Due_Date | Task_Done_Date | Review_Do_Date | Review_Done_Date |
|---|---|---|---|---|---|---|---|---|---|
| | | | | | | | | | |
| | | | | | | | | | |
| | | | | | | | | | |

Primary field in Table 3
Secondary field in Table 1

Fig. 13

TABLE 1
Entity_Date/Time
Entity_Code
Project_No
Doc_Image/Text
Doc_Publish_Date
Doc_Author/Source
Subject_Matter
Doc_Whole/Part
Account_Location
Doc-View

TABLE 2
Entity_Code
Entity_Name
Entity_Address
Entity_Info
Entity_Tel_No
Entity_Fax_No
Entity_EMail
Reference_Code
Reference_Kind
Reference_Info

Table 3
Project_No
Project_Kind
Project_Name
Security_Level
Archive_Term
Task_Entry
Task_Due_Date
Task_Done_Date
Review_Due_Date
Review_Done_Date

Fig. 14

| QUERY 1 | | | |
|---|---|---|---|
| Entity_Code | Entry_Date/Time | Project_No | Doc_View |
| | | | |
| | | | |
| | | | |

Fig. 15

| QUERY 2 | | | |
|---|---|---|---|
| Archive_Term | Entry_Date/Time | Physical_Location | Doc_View |
| | | | |
| | | | |
| | | | |

Fig. 16

SYSTEMS, PROCESSES, AND PRODUCTS FOR STORAGE AND RETRIEVAL OF PHYSICAL PAPER DOCUMENTS, ELECTRO-OPTICALLY GENERATED ELECTRONIC DOCUMENTS, AND COMPUTER GENERATED ELECTRONIC DOCUMENTS

CROSS REFERENCE TO RELATED APPLICATIONS

The present application is a continuation-in-part of U.S. application Ser. No. 08/882,833, filed Jun. 26, 1997, now U.S. Pat. No. 6,236,767, which claims the benefit of U.S. Provisional application No. 60/020,902, filed Jun. 27, 1996.

STATEMENT REGARDING FEDERALLY SPONSORED RESEARCH AND DEVELOPMENT

Not Applicable

BACKGROUND OF THE INVENTION

1. Field of the Invention

The present invention relates to systems, processes and products for the storage and retrieval of documentary information, including: physical paper documents; corresponding electro-optically generated electronic documents, e.g. digital images produced by scanning or photography; and computer generated electronic documents, e.g. digital text produced by word processing and/or digital graphics produced by computer aided design.

2. The Prior Art

Numerous systems and processes have been proposed for the storage and retrieval of documentary information. Traditional practices over the centuries, of course, have involved storage and retrieval by manually accessing indexed arrangements of original papers and "hard copies" in folders, boxes, shelving and cabinets. Later practices have involved photographically reducing the original papers to produce indexed miniaturizations in microfilm spools or microfiche sheets, storing the spools or sheets in indexed containers, folders or other physical repositories, and retrieving images or hard copies of the miniaturizations by optical projection or photographic reproduction.

Now there are a proliferation of proposals for digital computer systems that opto-electronically scan original papers: to create electronic representations in computer memory; to store digital records of these representations in magnetic and/or optical media; and to retrieve images or hard copies corresponding to these records electro-magnetically or electro-optically.

Recent advances in low cost computer architecture, particularly, faster clock speeds, higher resolution displays, and denser storage media, have generated discussions of whether or not a "paperless office" is possible, and, indeed, what is the meaning of "paperless office."

Furthermore, in many cases, reference to original papers or other original physical documents, even if infrequent, may be essential. For example, original physical documents may be required or desired: (1) in litigation where specific rules of evidence pertain; (2) as backup in the event that lost or faulty images are discovered later; (3) in major commercial, financial and insurance dealings where physical signatures may be important or merely may be perceived to be important; (4) in Internet transactions where the parties do not meet legal requirements for dispensing with paper records or do not agree to do so; (5) as backup for technical graphics, precision photographs, medical diagnostics, and the like, where differences in resolution between images and originals may become significant; (6) as backup in the event of corruption of electronic files; (7) as complete copies of voluminous treatises in which only the table of contents and/or other selected portions have been imaged for convenience; and (8) in large organizations, where careful planning requires the periodic destruction of selected corresponding paper and electronic records that may bear dates prior to some legally mandated or permitted threshold, or where unnecessary paper proliferation may become a source of confusion.

Much confusion has been encountered in the implementation of systems that are based on: original paper documents themselves; imaged electronic documents of the type that are created by scanning or photographing paper documents and the like; and computer generated electronic documents of the type that are created by word processors and the like. This confusion compounds a variety of conflicts, among which are: whether to store bit maps based on simple scanning, or text resulting from optical character recognition, or both; whether or not to mix optically generated electronic documents and computer generated electronic documents; whether or not the storage of optically generated electronic image files should mirror the storage of the original paper documents; whether or not an original paper filing system should be retained without change; whether or not a system is so sophisticated that computer literate professional level operators and/or supervisors are required; and whether or not a system is so rudimentary that even entry level operators may be sufficiently trustworthy.

The foregoing problems are greatly magnified in networked systems, where difficulties may be encountered particularly in standardizing, at disparate locations, the storage and retrieval of original physical paper documents, and, sometimes, hard paper copies of electro-optically generated and computer generated documents. There is a requirement for systems: in which the physical filing of paper documents is radically simplified; in which access to infrequently needed paper documents is precisely indicated; and in which optically generated electronic documents and computer generated electronic documents are clearly differentiated.

DEFINITIONS

In order to maintain clarity, the present application adopts the following definitions:

(I) physical documents (sometimes abbreviated to physical files) are defined herein as actual paper documents or actual photographs or the like, of the type that are directly visually perceptible.

(II) electronic image documents (sometimes abbreviated to image documents or image files) are defined herein as electronic files of the type that are generated electro optically by scanning or photographing physical documents such as actual paper documents, photographs, and the like. In one form, these electronic image documents are bitmap documents.

(III) electronic work documents (sometimes abbreviated to work documents or work files) are defined herein as electronic files of the type that are generated in a computer by a word processor program, a spreadsheet, a computer aided design program, or the like. In one form, these electronic work documents are PostScript documents. 5PostScript is a page description language originated by Adobe Systems, Inc.

(IV) electronic documents (sometimes referred to as electronic files) include electronic image documents and electronic work documents.

SUMMARY OF THE INVENTION

The primary object of the present invention is to provide, for the storage and retrieval of original physical documents (printed paper and photographic presentations) electronic image documents (electro-optically generated electronic documents), and electronic work documents (computer generated electronic documents): systems, processes and products, which facilitate the use of electronic documents rather than physical documents whenever feasible or acceptable, but which also facilitate the use of physical documents rather than electronic documents whenever necessary or preferred. The result is less organizational confusion and emotional frustration, and more creative use of time and resources. The systems, processes and products of the present invention are particularly advantageous in connection with simultaneously archiving and later simultaneously disposing of corresponding physical and electronic documents.

More specifically, the present invention contemplates the following features.

(1) Electronic image documents and electronic work documents, which may be completely unrelated in form or content, are acquired or produced to provide one or more real time sequences of electronic documents in one or more real time sequences of date/time instances. (2) Acquired or produced physical documents, for ultimate convenience, simply are added to the front (or the back) of one or more cumulative physical stacks. (3) The resulting electronic records, with assured precision, uniquely identify the physical locations of the physical documents and the electronic locations of the electronic documents, both in terms of their associated date/time instances. (4) In effect, these date/time instances guarantee that virtual sets of related physical documents may be conveniently accessed and physically retrieved, and that corresponding sets of related electronic documents may be immediately displayed and suitably presented. (5) Also, pursuant to any particular archive policy, these date/time instances can guarantee the joint disposal of corresponding physical and electronic documents that have been received and/or created prior to any selected date.

BRIEF DESCRIPTION OF THE DRAWINGS

For a fuller understanding of the nature and objects of the present invention, reference is made to the following specification, which is to be taken in connection with the accompanying drawings wherein.

DETAILED DESCRIPTION OF THE PREFERRED EMBODIMENT

Introduction

Figure 1:
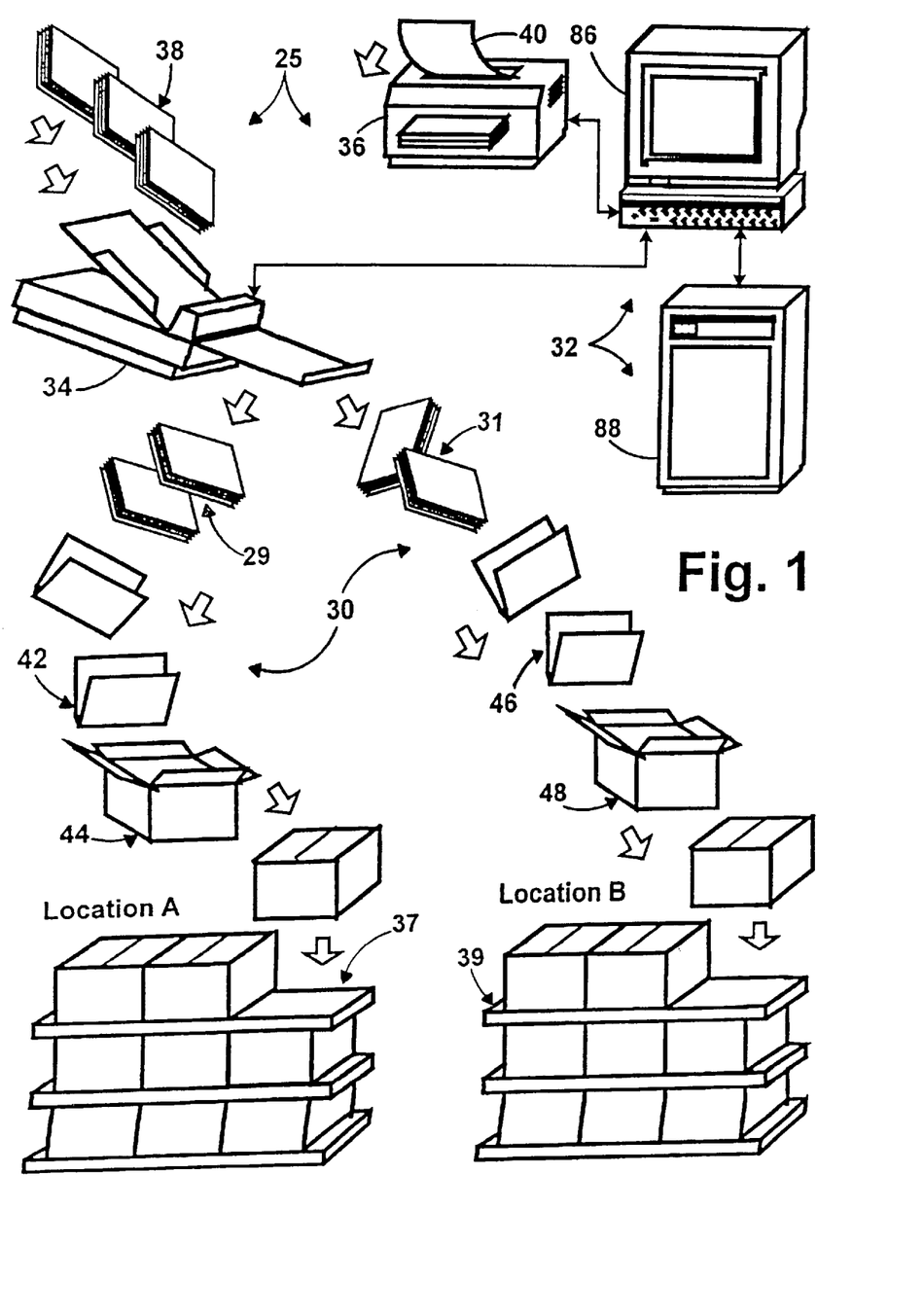
FIG. 1 illustrates a system embodying the present invention.
Figure 1A:
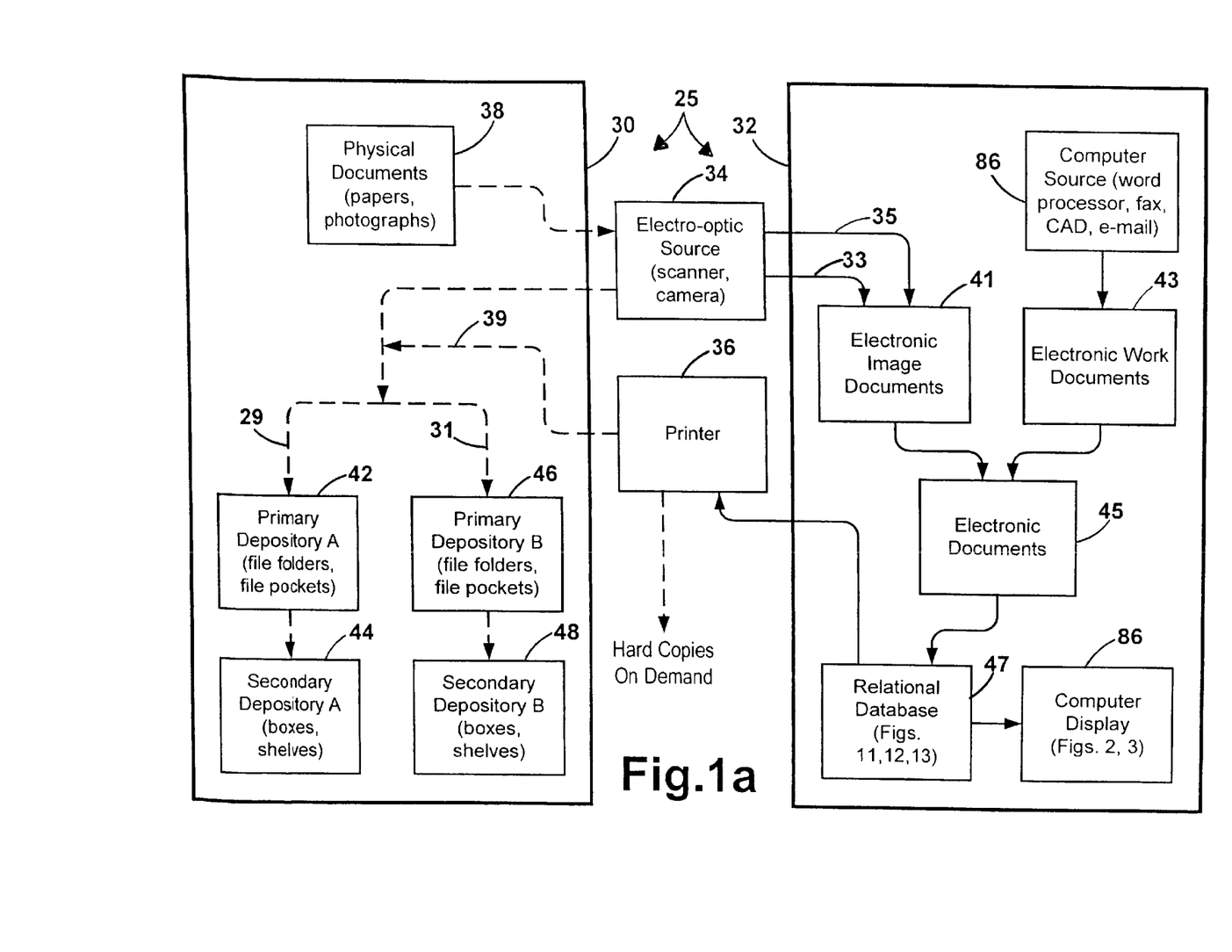
FIG. 1a is a flow diagram of the system of FIG. 1.

As shown in FIGS. 1 and 1a, the illustrated embodiment of the present invention comprises a master system 25 that includes a physical system 30 and an electronic system 32. The physical and electronic systems share a scanner 34 and a printer 36. Scanner 34 processes random sequences of paper documents 38 to produce sequences of electronic image documents 27 in sequences of date/time instances. In the present embodiment, scanner 34 processes two document streams 29 and 31 to produce two streams of electronic image documents 33 and 35. Physical documents 29 and electronic image documents 33 of the first stream are archived permanently. Physical documents 31 and electronic image documents 35 of the second stream are archived for limited date/time periods.

The Physical System

In the first document stream 29, date/time sequences of physical folders 42 store date/time sequences of paper documents 38 from the scanner 34, and date/time sequences of boxes 44 in turn store date/time sequences of folders 42. In the second document stream 31, date/time sequences of physical folders 46 store date/time sequences of paper documents 38 from the scanner 34, and date/time sequences of boxes 48 in turn store date/time sequences of physical folders 46. The destination of folders 42 and boxes 44 of the first stream 29 is location 37, designated Location A. The destination of folders 46 and boxes 48 of the second stream 31 is location 39, designated Location B. The physical folders and boxes typically are constructed from inexpensive materials, for example, cardboard, plastic or the like.

Figure 4:
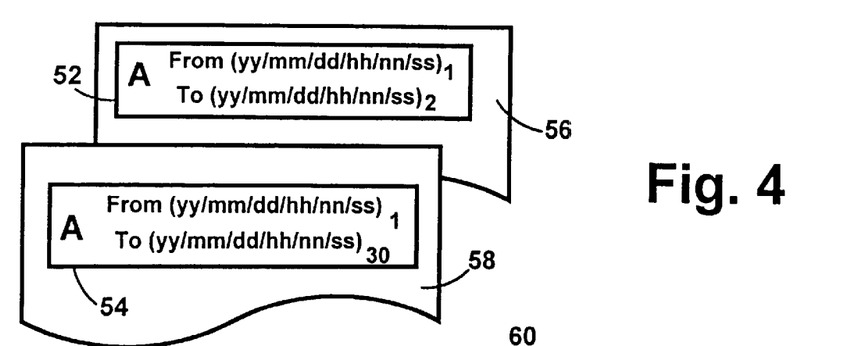
FIG. 4 illustrates labels that are affixed to a first stream of primary and secondary repositories in accordance with the present invention.
Figure 5:
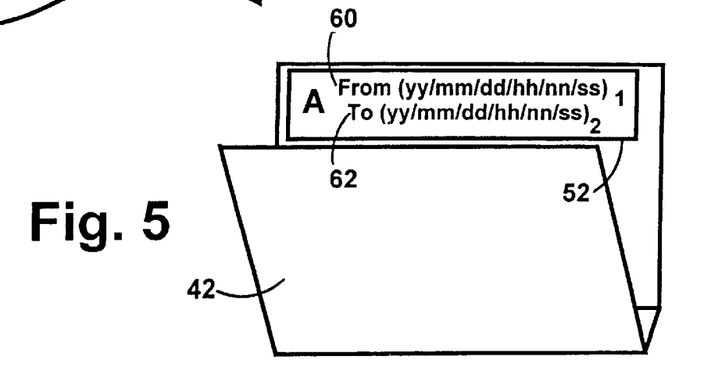
FIG. 5 illustrates a file folder of the first stream having visual indicia specifying a date/time interval that bounds a sequence of physical paper documents of the type corresponding to the thumbnail images of FIG. 2.
Figure 6:
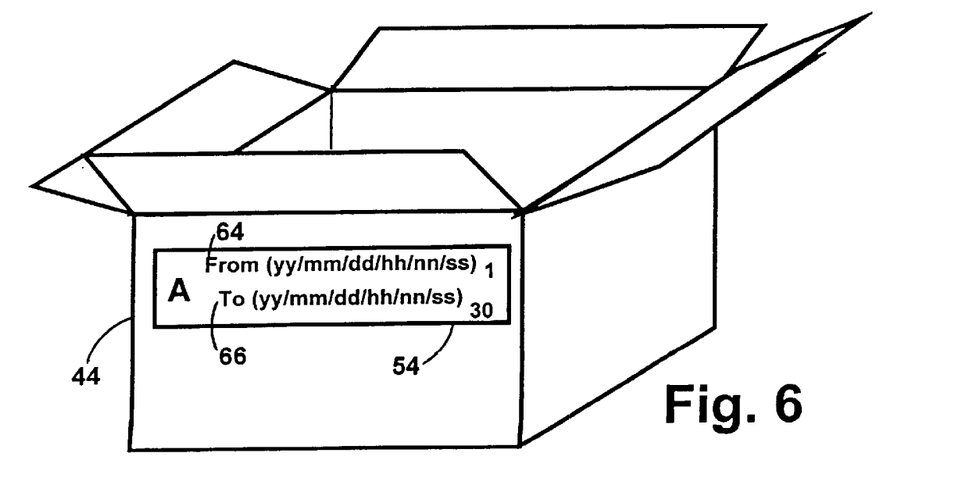
FIG. 6 illustrates a box of the first stream having visual indicia specifying a date/time interval that bounds a sequence of file folders of the type corresponding to the file folder of FIG. 5.

As is shown in FIG. 4, the physical visual indicia are in the form of pressure sensitive labels 52 and 54, which are removably mounted on the plastic coated faces of carrier sheets 56 and 58, respectively. As shown in FIG. 5, when label 52 is peeled from carrier sheet 56 and applied to folder 42, printed indicia 60 and 62 indicate the start and finish of the range of date/time instances of the paper documents therewithin, and additionally their physical destination, Location A. As shown in FIG. 6, when label 54 is peeled from carrier sheet 58 and applied to box 44, printed indicia 64 and 66 indicate the start and finish of the range of date/time instances of the folders therewithin, and additionally their physical destination, Location B.

Figure 7:
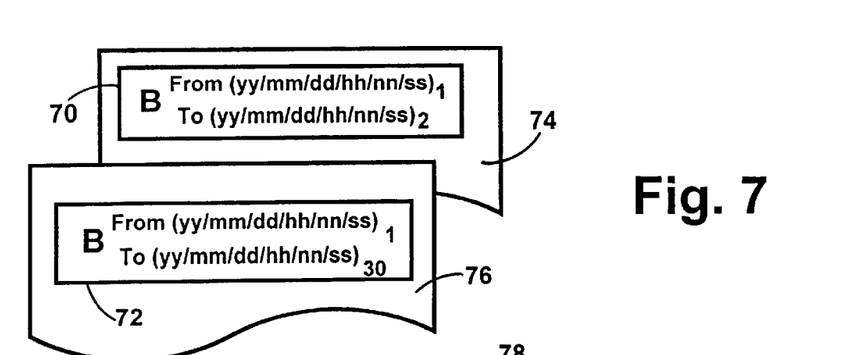
FIG. 7 illustrates labels that are affixed to a second stream of primary and secondary repositories in accordance with the present invention.
Figure 8:
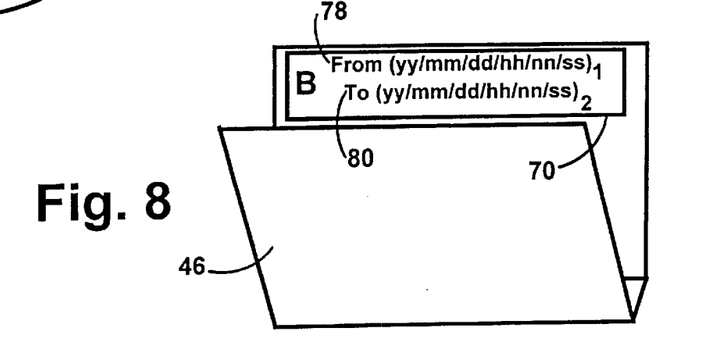
FIG. 8 illustrates a file folder of the second stream having visual indicia specifying a date/time interval that bounds a sequence of physical paper documents of the type corresponding to the thumbnail images of FIG. 2.
Figure 9:
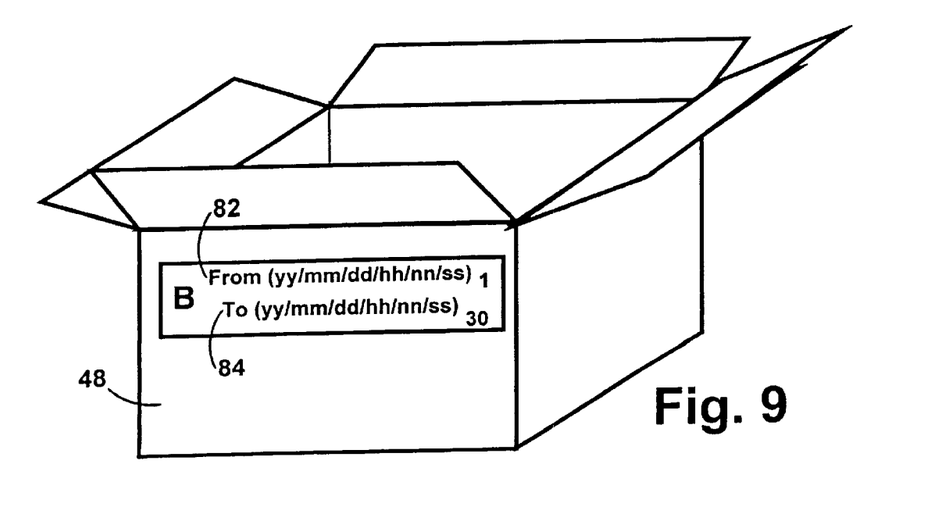
FIG. 9 illustrates a box of the second stream having visual indicia specifying a date/time interval that bounds a sequence of file folders of the type corresponding to the file folder of FIG. 8.

As is shown in FIG. 7, the physical visual indicia are in the form of pressure sensitive labels 70 and 72, which are removably mounted on the plastic coated faces of carrier sheets 74 and 76, respectively. As shown in FIG. 8, when label 70 is peeled from carrier sheet 74 and applied to folder 46, printed indicia 78 and 80 indicate the beginning and ending of the range of date/time instances of the paper documents therewithin, and additionally the physical destination, location B 37, of the relevant document stream. As shown in FIG. 9, when label 72 is peeled from carrier sheet 76 and applied to box 48, printed indicia 82 and 84 indicate the beginning and ending of the range of date/time instances of the folders therewithin, and additionally the physical destination, location B 37, of the relevant document stream.

Figure 10:
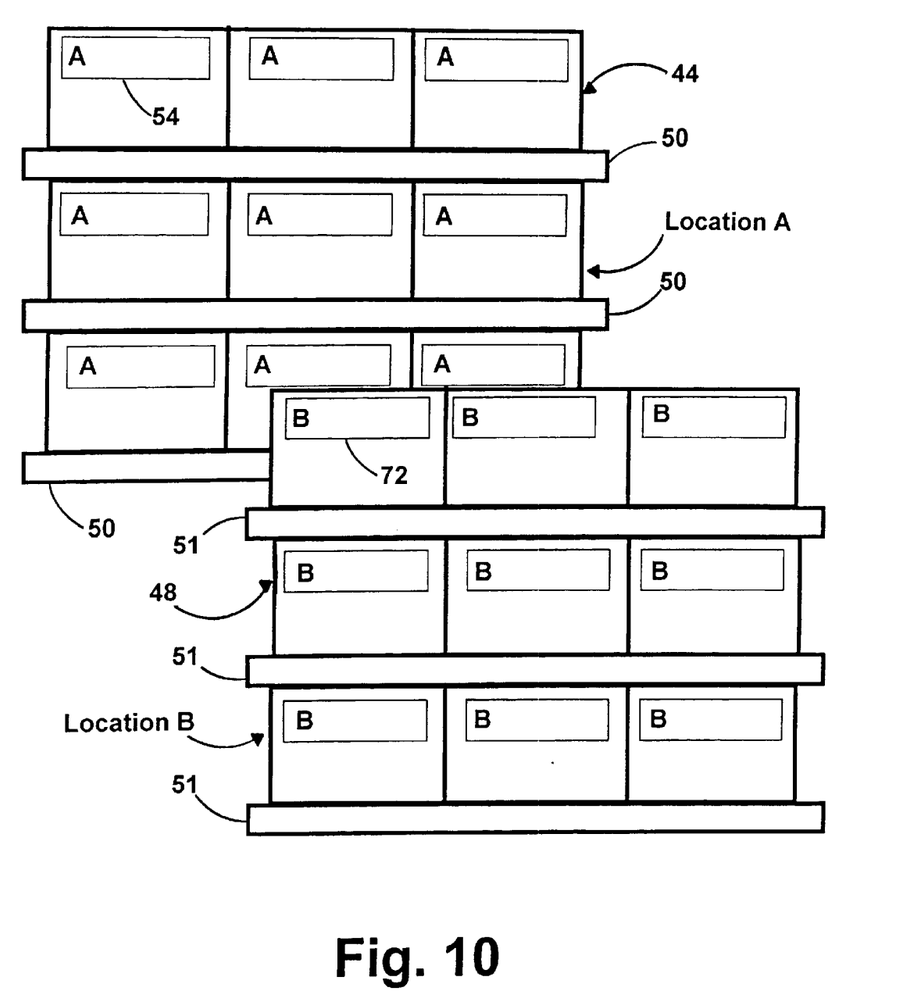
FIG. 10 illustrates a plurality of stacks of boxes that are organized pursuant to one application of the system of the present invention.

As shown in FIG. 10, distinguishably marked boxes 44 and 48 are stored on shelves 50 and 51 in physical locations A and B, respectively. Location A receives those physical documents that are to be archived permanently, and location B receives those documents that are to be archived for limited periods of time.

In one embodiment of the present invention, the different documents of the sequential batches are separated by slip sheets, which are imprinted with applicable date/time instances by printer 36. The integrity of any designated stack is maintained by monitoring the physical storage and retrieval of any processed document to and from that stack.

The Electronic System

As shown in FIG. 1, electronic system 32 includes a workstation 86 and an electronic storage 88. Workstation 86 is operatively connected to scanner 34 for transmission to the scanner of control signals that synchronize the production of date/time instances, and that receive, from the scanner, data signals representing electronic image documents and their date/time identifiers. Workstation 86 is operatively connected to electronic storage 88 for transmission to and retrieval from electronic storage 84 of control and data signals that represent electronic documents, and their date/time identifiers.

Figure 2:
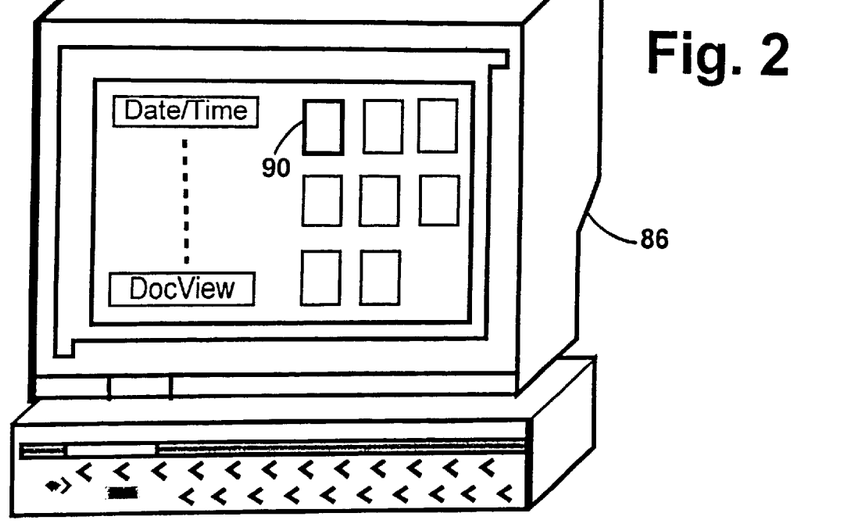
FIG. 2 illustrates a graphical user interface displaying a form with date/time indexing features and a window that presents thumbnail displays of images and views, the entries of which fall within a specific date/time interval.

As shown in FIG. 2, electronic image documents 33 and 35 are assembled by electronic system 32 as a date time sequence of electronic image documents 41. Also, under the control of any of a variety of word processor, fax, computer aided design (CAD), and e-mail programs, computer 86 produces a date/time sequence of electronic work documents 43. Electronic image documents 42 and electronic work documents 43 are assembled by electronic system 32 as a date/time sequence of electronic documents 47. Electronic documents 45 are assembled by electronic system 32 in a relational database 47, to be described in detail below. Electronic work documents 43 include electronic image documents in any of various bitmap, vector, text or other formats, such as the PDF (Portable Document Format) format promulgated by Adobe Systems, Inc., or the XML (Extensible Markup Language) format promulgated by Microsoft Corporation, among others.

Figure 3:
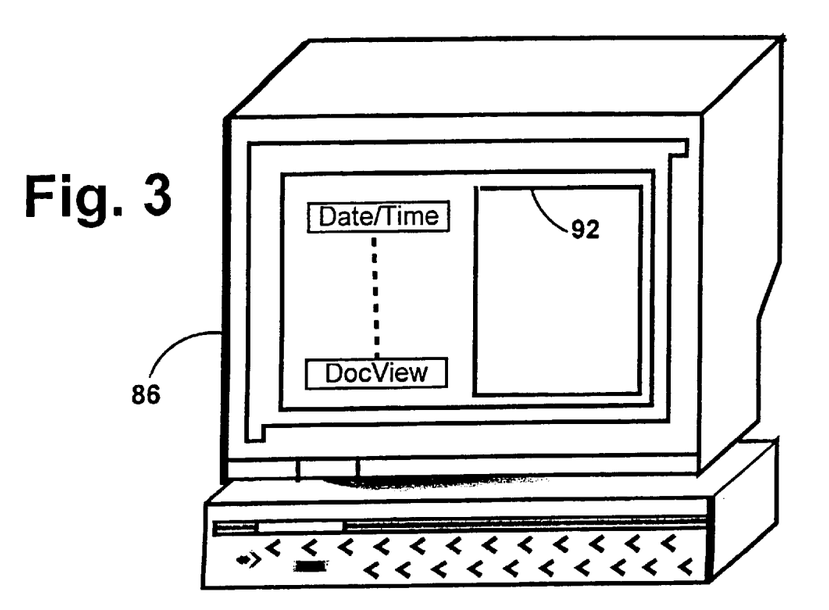
FIG. 3 illustrates a graphical user interface displaying a form with date/time indexing features and an imaging window that displays a blow-up view corresponding to one of the thumbnail views of FIG. 2, the entries of which fall within a specific date/time interval.

As shown in FIGS. 2 and 3, workstation 86 can present the electronic documents 45, generated by scanner 34 and computer 86, as thumbnail views 90 or blow-up views 92. Workstation 86 is operatively connected to printer 36 for transmission to and receipt from the printer of control signals, and for the production of visual materials. These visual materials include labels 52, 54, 70 and 72, as well as read-outs of logical sets of records that are retrieved from relational database 47.

Figure 11:
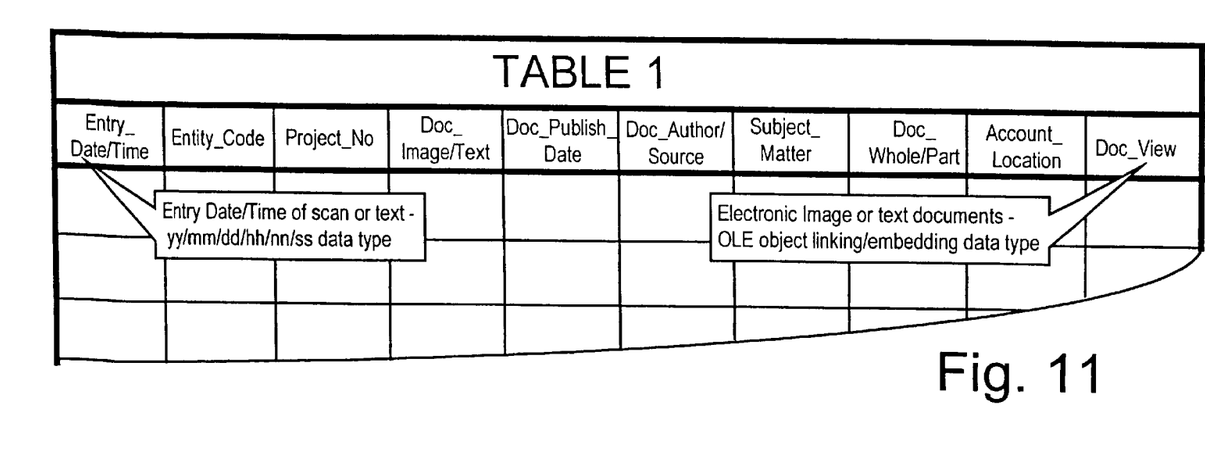
FIG. 11 illustrates a table of a relational database that supports the system, process and product of FIG. 1.
Figure 12:
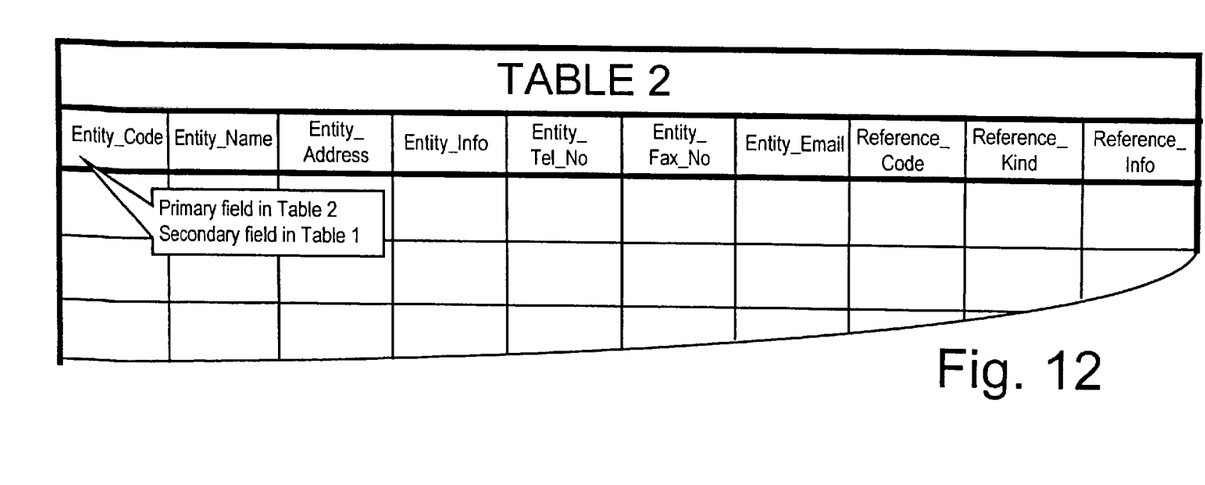
FIG. 12 illustrates another table of the relational database referred to in FIG. 11.
Figure 13:
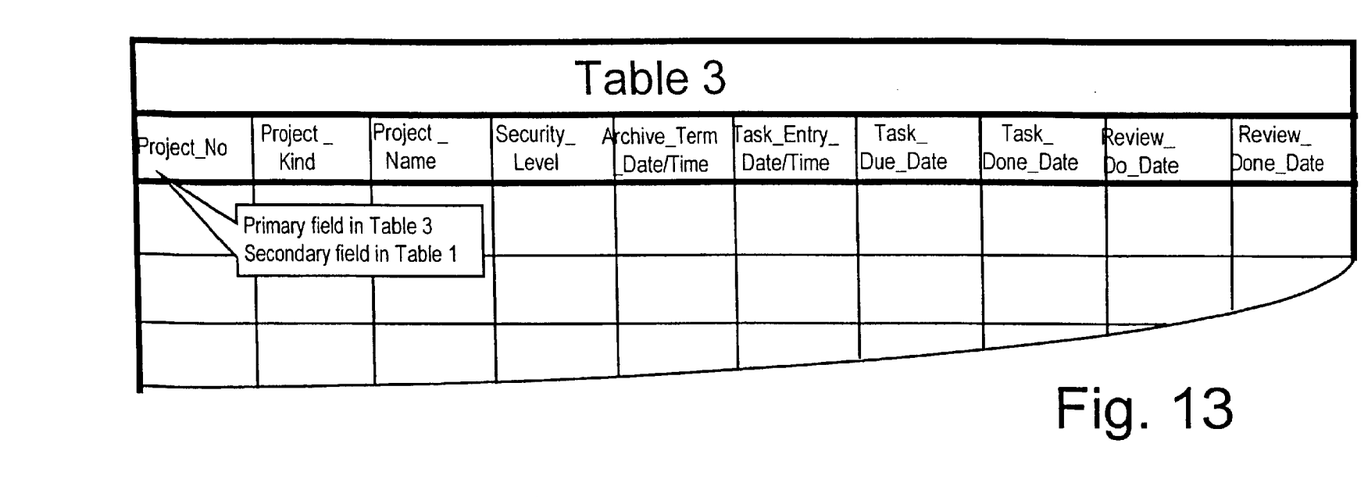
FIG. 13 illustrates a further table of the relational database referred to in FIGS. 11 and 12.

Relational database 47 includes tables, which are Shown in FIGS. 11, 12 and 13. The fields of these tables are described in the following schedules.

| Field Name | Data Type | Field Type - Description |
|---|---|---|
| Entry_Date/Time | Date/Time | Primary - unique entry in terms of yy/mm/dd/hh/nn/ss |
| Entity_Code | Text | Secondary - entity identification |
| Project_No | Text | Secondary - project identification |
| Doc_Image/Text | Text | Secondary - generated by scanner or computer |
| Doc_Publish_Date | Text | Secondary - actual date of document |
| Doc_Author/Source | Text | Secondary - name of author/source |
| Subject_Matter | Text | Secondary - content descriptors |
| Doc_Whole/Part | Text | Secondary - whole means entire document imaged, part means only a part imaged |
| Physical_Storage_Location | Text | Secondary - location depends on archive duration |
| Doc_View | OLE | Primary - object linking/embedding - display image document or work document |

SCHEDULE 1 (See Table 1, FIG. 11)

| Field Name | Data Type | Field Type - Description |
|---|---|---|
| Entity_Code | Text | Primary - unique identifier of associated organization or individual |
| Entity_Name | Text | Secondary - name of organization or individual |
| Entity_Address | Text | Secondary - address of organization or individual |
| Entity_Info | Text | Secondary - relevant notes |
| Entity_Tel_No | Text | Secondary - telephone number of organization or individual |
| Entity_Fax_No | Text | Secondary - fax number of organization or individual |
| Entity_Email | Text | Secondary - uniform resource locator of organization or individual |

-continued

| Field Name | Data Type | Field Type - Description |
| --- | --- | --- |
| Reference_Code | Text | Secondary - entity code of contact or other associated individual or organization |
| Reference_Kind | Text | Secondary - nature of association |
| Reference_Info | Text | Secondary - relevant notes |

SCHEDULE 2 (See Table 2, FIG. 12)

| Field Name | Data Type | Field Type - Description |
| --- | --- | --- |
| Project_No | Text | Primary - unique identifier of project |
| Project_Kind | Text | Secondary - select from categories [1], [2], . . ., [n] |
| Project_Name | Text | Secondary - formal project name |
| Security_Level | Text | Secondary - select from categories [1], [2], . . ., [n] |
| Archive_Term | Date/Time | Secondary - document stream selection - term finish date |
| Task_Entry_Date | Date/Time | Secondary - review date |
| Task_Due_Date | Date/Time | secondary - due date |
| Task_Done_Date | Date/Time | Secondary - done date |
| Review_Due_Date | Date/Time | secondary - due date |
| Review_Done_Date | Date/Time | Secondary - done date |

SCHEDULE 3 (See Table 3, FIG. 13)

Figure 14:
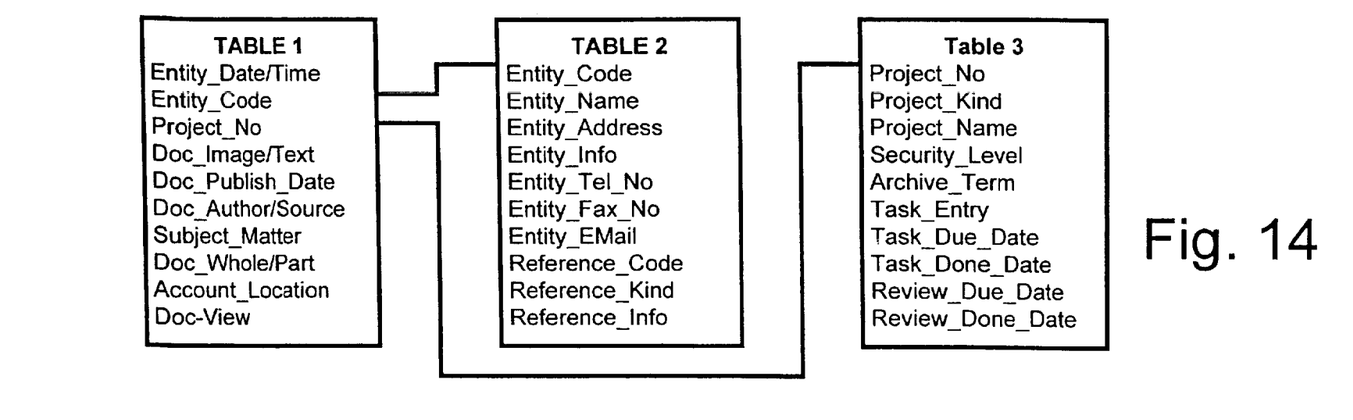
FIG. 14 represents an electronic diagram that indicates relationships among the tables of FIGS. 11, 12 and 13.
Figure 15:
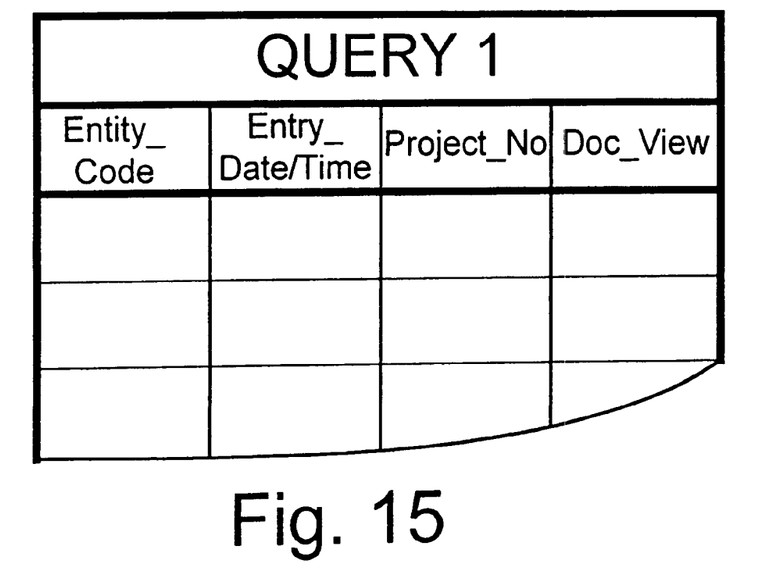
FIG. 15 illustrates an electronic query based upon the electronic diagram of FIG. 14.
Figure 16:
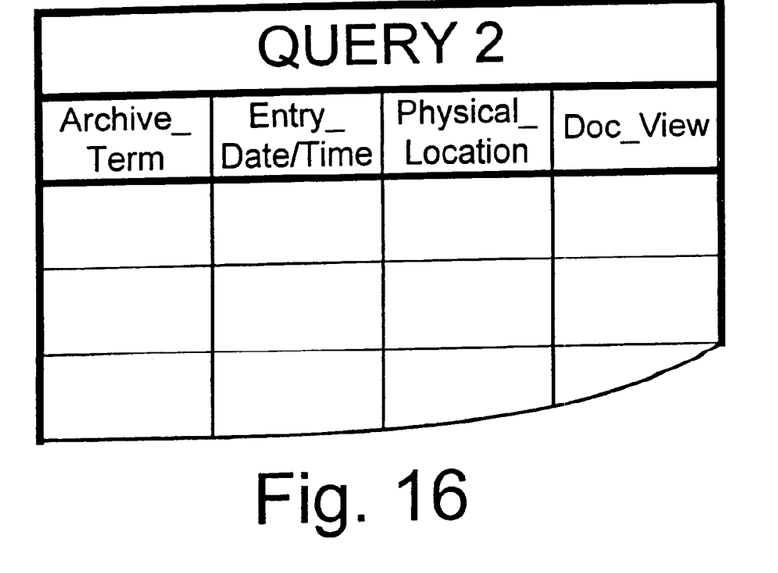
FIG. 16 illustrates another electronic query based upon the electronic diagram of FIG. 14.

As will be seen in FIG. 14, the following relational links exist among Tables 1, 2 and 3 of FIGS. 11, 12 and 13, above. The Entity_Code MANY (secondary) field of Table 1 is linked to the Entity_Code ONE (primary) field of Table 2. The Project_No MANY (secondary) field of Table 1 is linked to the Project_No ONE (primary) field of Table 3.

Preferably, a date/time instance value in the Entry_Date/Time field of Table 1 is automatically generated by the system during scanning or computer generation. In one form, this value is in terms of year, month, day, hour, minute, second, and fractions of second, i.e., yy, mm, dd, hh, nn, ss, ff. In another form, this value is in terms of year, month, day, hour, minute and sequential integers, i.e., yy, mm, dd, hh, nn, ii. The timing is arranged so that each electronic document (image or work) is uniquely identified at the moment of its acquisition or creation by entry of a date/time instance or a date/time instance that includes an integer.

OPERATION

The system, processes and products of the present invention operate as follows. Electronic image documents 41 and electronic work documents 43 are acquired or produced to provide one or more real time sequences of electronic documents 45 in one or more real time sequences of date/time instances 52, 54, 70, 72. Acquired or produced physical documents simply are added to the front (or the back) of one or more cumulative physical stacks 29, 31. The resulting electronic records, as shown in Tables 1, 2 and 3 (FIGS. 11, 12 and 13), uniquely identify the physical locations of the physical documents 38 and the electronic locations of the electronic documents 45, both in terms of their associated date/time instances. These date/time instances guarantee that virtual sets of related physical documents 38 may be readily located and conveniently retrieved, and that corresponding sets of related electronic documents 45 may be immediately displayed and suitably reported. Pursuant to any particular archive policy, these date/time instances guarantee the joint disposal of corresponding physical and electronic documents, which are scheduled for disposal on any selected archival termination date.

What is claimed is:

1. A system comprising a computer and a scanner for processing paper documents and electronic documents, certain of said electronic documents constituting electronic image documents corresponding to certain of said paper documents, certain of said electronic documents being computer generated electronic work documents:

(a) said scanner being operative for production of said image documents from said paper documents to provide pairs of said paper documents and said image documents;

(b) said computer being driven by at least one application for production of said work documents;

(c) said production of said documents being effected in an arbitrary real time sequence such that each of said documents is automatically specified by a unique date/time identifier;

(d) a physical storage for containing at least one physical collection of said paper documents substantially in said real time sequence;

(e) each of said paper documents being logically classified by its date/time identifier with the date/time identifiers of other paper documents;

(f) said paper documents being logically classified by other identifiers into restricted virtual groups;

(g) paper documents of different ones of said restricted virtual groups being intermingled physically throughout said physical collection;

(h) an electronic storage responsive to said application for containing at least one electronic collection of said image documents and said work documents;

(i) each of said electronic documents in said electronic collection being logically classified by its date/time identifier with the date/time identifiers of other image documents and work documents in said electronic collection;

(j) said image documents and said work documents in said electronic collection being logically classified by said other identifiers into restricted electronic groups;

(j) said application recording said date/time sequences and for presenting said restricted groups of electronic documents;

(k) said physical storage having a plurality of physical containers for holding said paper documents substantially in said real time sequence;

(l) said physical containers being uniquely marked with visual media designating ranges of said date/time identifiers;

(m) paper documents of different ones of said restricted virtual groups being intermingled physically throughout said physical containers.

2. The system of claim 1 wherein said date/time identifiers specify seconds.

3. A process using a scanner and a computer to process paper documents and electronic documents, certain of said electronic documents constituting electronic image documents corresponding to certain of said paper documents, certain of said electronic documents being computer generated electronic work documents, said process comprising as steps:

(a) scanning said paper documents for the production of said image documents from said paper documents to provide pairs of said paper documents and said image documents;

(b) running at least one application in said computer for the production of said work documents;

(c) said production of said documents being effected in an arbitrary real time sequence such that each of said documents is automatically specified by a unique date/time identifier;

(d) depositing in a physical storage at least one physical collection of said paper documents substantially in said real time sequence;

(e) each of said paper documents being logically classified by its date/time identifier with the date/time identifiers of other paper documents;

(f) said paper documents being logically classified by other identifiers into restricted virtual groups;

(g) paper documents of different ones of said restricted virtual groups being intermingled physically throughout said physical collection;

(h) depositing in an electronic storage at least one electronic collection of said image documents and said work documents;

(i) each of said image documents in said electronic collection being logically classified by its date/time identifier with the date/time identifiers of other image documents and work documents in said electronic collection;

(j) said image documents and said work documents in said electronic collection being logically classified by said other identifiers into restricted electronic groups;

(k) said application recording said date/time sequences and presenting said restricted groups of electronic documents;

(l) said physical storage having a plurality of physical containers for holding said paper documents substantially in said real time sequence;

(m) uniquely marking said physical containers with visual media designating ranges of said date/time identifiers;

(n) paper documents of different ones of said restricted virtual groups being intermingled physically throughout said physical containers.

4. A document storage and retrieval system comprising a physical system for filing a sequence of paper documents, a scanner for converting said sequence of paper documents to a sequence of electronic image documents, and an electronic system for producing a sequence of electronic work documents, said electronic image documents and said electronic work documents constituting electronic documents, said electronic system filing said electronic documents at a sequence of date/time instances, certain of said date/time instances uniquely designating matched pairs of said paper documents and said electronic image documents:

(a) said physical system including a primary physical repository and a plurality of secondary physical repositories therein, selected ranges of said sequence of paper documents corresponding to selected ranges of said date/time instances, said selected ranges of said sequences of paper documents being contained by selected ones of said secondary physical repositories, said selected ones of said secondary physical repositories being visually marked with physical indicia corresponding to said selected ranges of said date/time instances;

(b) said electronic system presenting at least one electronic table representing a grid containing rows of electronic records and columns of electronic fields, at least one of said electronic fields including a primary electronic field and a plurality of secondary electronic fields, said primary electronic field including a sequence of date/time entries that designate a corresponding sequence of said paper documents and said electronic documents, said secondary electronic fields including arrangements of other entries that designate corresponding arrangements of logical groups of said paper documents and logical groups of said electronic images;

(c) said logical groups of said paper documents including virtual collections of said paper documents that are intermingled throughout said secondary repositories so as to be unadapted for immediate physical compilation; the location in said secondary repositories of any one paper document being indicated by at least one of said records that includes the date/time instance by which said one paper document is uniquely identified; said logical groups of said electronic documents being identified by logical groups of said electronic records so as to be adapted for immediate electronic compilation.

5. The system of claim 4 wherein said secondary depositories include physical file folders and imprinted on said folders are visual indicia specifying limited date/time ranges of physical documents therein.

6. The system of claim 4 wherein said secondary depositories include file pockets and imprinted on said file pockets are visual indicia specifying limited date/time ranges of physical documents therein.

7. The system of claim 4 wherein said primary depositories are boxes and imprinted on said boxes are visual indicia specifying limited date/time ranges of physical documents therein.

8. The system of claim 4 wherein said electronic system automatically generates electronic date/time indicia in said primary field at each of said date/time instances.

9. A database storage comprising at least one physical storage location for filing and retrieving at least one date/time sequence of paper documents, and at least one electronic storage for filing and retrieving at least one date/time sequence of electronic documents:

(a) said paper documents in said one physical storage location being stored in a single order corresponding to the date/time sequence of their filing;

(b) said electronic documents including electronic image documents that are counterparts of said paper documents, and electronic work documents that are not counterparts of said paper documents;

(c) certain of said paper documents and certain of said electronic image documents constituting matched pairs;

(d) certain of said date/time instances uniquely designating said matched pairs, the paper document and the electronic image document of each of said matched pairs being substantially identical visually;

(e) said electronic system presenting an electronic table representing a grid containing rows of electronic records and columns of electronic fields;

(f) at least one of said fields being a primary field characterized by a date/time data type;

(g) at least a plurality of other fields being secondary fields characterized by at least another data type;

(h) said physical system including a primary container and a plurality of secondary containers therein;

(i) a physical collection of said paper documents being deposited in said plurality of secondary containers;

(j) each of said pairs being logically classified by one of said date/time identifiers of said primary field, each of said pairs logically classified by said other data type into restricted virtual groups;

(k) paper documents of different ones of said restricted virtual groups being intermingled physically throughout said secondary containers;

(l) the physical location of a particular document being indicated by a particular one of said date/time instances.

10. A digital system for producing a collection of electronic images from a collection of paper documents in an arbitrary date/time sequence of transactions, the paper documents and electronic images thereby being matched in pairs:

(a) each pair being uniquely identified by one of said date/time sequence of transactions;

(b) different pairs being classified by different contents in different logical groups;

(c) a primary physical container and a plurality of secondary physical containers therein;

(d) ranges of said paper documents being deposited in said secondary physical containers;

(e) said ranges being uniquely identified by corresponding ranges of said date/time sequence;

(f) said secondary physical containers being marked with physical indicia corresponding to said ranges of said date/time sequence;

(g) an electronic table representing a grid containing rows of electronic records and columns of at least a primary electronic field and a plurality of secondary electronic fields;

(h) entries in said primary field identifying said date/time sequence of transactions;

(i) entries in said secondary fields identifying said different logical groups;

(j) paper documents identifying said different logical groups being intermingled in said secondary physical;

(k) logical groups of electronic images being organized by said entries in said secondary fields for electronic presentation;

(l) the date/time entry for any electronic image indicating the physical location in said secondary containers of the paper document represented thereby.

11. The digital system of claim 10 wherein said date/time sequence specifies seconds.

12. A digital process for producing a collection of electronic images from a collection of paper documents in an arbitrary date/time sequence of transactions, the paper documents and electronic images thereby being matched in pairs:

(a) uniquely identifying each pair by one of said date/time sequence of transactions;

(b) different contents classifying different pairs in different logical groups;

(c) depositing ranges of said paper documents in a plurality of secondary physical containers;

(d) depositing said plurality of secondary physical containers in a primary physical container;

(e) automatically identifying said ranges of paper documents by corresponding ranges of said date/time sequence;

(f) marking said secondary physical containers with physical indicia corresponding to said ranges of said date/time sequence;

(g) creating an electronic table representing a grid containing rows of electronic records and columns of at least a primary electronic field and a plurality of secondary electronic fields;

(h) inserting entries in said primary field identifying said date/time sequence of transactions;

(i) inserting entries in said secondary fields identifying said different logical groups;

(j) intermingling paper documents identifying said different logical groups in said secondary physical containers;

(k) organizing logical groups of electronic images by said entries in said secondary fields for electronic presentation;

(l) the date/time entry for any electronic image indicating the physical location in said secondary containers of the paper document represented thereby.

13. The digital process of claim 12 wherein said date/time sequence specifies seconds.

14. A document storage and retrieval system comprising a physical system for filing a sequence of paper documents, a scanner for converting said sequence of paper documents to a sequence of electronic images at a sequence of date/time instances, and an electronic system for filing said sequence of electronic images, each one of said date/time instances uniquely designating a matched pair of one of said paper documents and one of said electronic images:

(a) said physical system including at least a primary physical repository and a plurality of secondary physical repositories therein, selected ranges of said sequence of paper documents corresponding to selected ranges of said date/time instances, said selected ranges of said sequences of paper documents being contained by selected ones of said secondary physical repositories, said selected ones of said secondary physical repositories being visually marked with physical indicia corresponding to said selected ranges of said date/time instances;

(b) said electronic system presenting an electronic table representing a grid containing rows of electronic records and columns of electronic fields, said electronic fields including a primary electronic field and a plurality of secondary electronic fields, said primary field including a sequence of date/time entries that designate a corresponding sequence of said paper documents and said electronic images, said secondary fields including arrangements of other entries that designate corresponding arrangements of logical groups of said paper documents and logical groups of said electronic images;

(c) said logical groups of said paper documents including virtual collections of said paper documents that are intermingled throughout said secondary repositories so as to be unadapted for immediate physical compilation, the location in said secondary repositories of any one paper document being indicated by a record that includes the date/time instance by which said one paper document is uniquely identified, said logical groups of said electronic images being identified by logical groups of said electronic records so as to be adapted for immediate electronic compilation.

15. The document storage and retrieval system of claim 14 wherein said date/time instances specify seconds.

16. A document storage system comprising:

(a) a physical system and an electronic system for storing pairs of paper documents and electronic images;

(b) each of said pairs being specified by a unique date/time identifier;

(c) a physical storage for containing at least one physical collection of said paper documents;

(d) each of said paper documents in said physical collection being logically classified by said date/time identifier with the date/time identifiers of the other paper documents in said physical collection;

(e) said paper documents in said physical collection being logically classified by other identifiers into restricted virtual groups;

(f) paper documents of different ones of said restricted virtual groups being intermingled physically throughout said physical collection;

(g) an electronic storage for containing at least one electronic collection of said electronic images;

(h) each of said electronic images in said electronic collection being logically classified by said date/time identifier with the date/time identifiers of the other electronic images in said electronic collection;

(i) said electronic images in said electronic collection being logically classified by said other identifiers into restricted image groups;

(j) digital processing means for recording said date/time sequence and for presenting said restricted image groups;

(k) said physical storage having a plurality of physical containers for holding said paper documents in said date/time sequence;

(l) said physical containers being uniquely marked with visual media designating ranges of said date/time identifiers;

(m) paper documents of different ones of said restricted virtual groups being intermingled physically throughout said physical containers.

17. The document storage system of claim 16 wherein both said physical system and said electronic system provide matched archival termination indicia, which enable concomitant disposal of physical documents and electronic images bearing the same date/time termination indicia.

18. A system for processing corresponding pairs of original paper documents and resulting electronic documents, said system comprising:

(a) a physical system and an electronic system;

(b) a scanner and a printer, both operatively connected to said physical system and said electronic system;

(c) said physical system having at least a primary physical repository and at least a plurality of secondary physical repositories therein;

(d) said secondary physical repositories holding selected sequences of said paper documents corresponding to selected ranges of date/time instances;

(f) said primary repository holding selected sequences of said selected secondary repositories;

(g) said primary physical repository and said secondary repositories being visually marked with physical indicia corresponding to sequences of date/time instances;

(h) said electronic system containing a database that includes a plurality of electronic tables, each representing a grid of rows of electronic records and columns of electronic fields;

(i) said electronic fields including at least one primary electronic field and at least a plurality of secondary electronic fields;

(j) said primary field including entries of said date/time instances which designate corresponding logical groups of paper documents and corresponding logical groups of electronic documents;

(k) said secondary fields including other entries which designate corresponding logical groups of the paper documents and of electronic documents;

(l) selected date/time instances in said primary field specifying the physical locations of selected paper documents and logical locations of selected electronic documents in terms of their date/time instances;

(m) said selected paper documents being virtual collections that are intermingled throughout said secondary repositories;

(n) said selected electronic documents being adapted for electronic compilation and presentation.

19. The system of claim 18 wherein said primary repositories include boxes.

20. The system of claim 18 wherein said secondary repositories include file folders.

21. The system of claim 18 wherein said secondary repositories include file pockets.

22. The system of claim 18 wherein said primary repositories include shelves.

23. The system of claim 18 wherein said primary repository includes at least a room.

24. The system of claim 18 wherein said electronic documents include electronic image files and electronic work files, and said paper documents occupy a plurality of locations, said paper documents in at least one of said locations and said image documents corresponding thereto being scheduled for disposal following a particular archive retention date, said paper documents in at least another of said locations and said image documents corresponding thereto being scheduled for permanent archive retention.

25. A database comprising:

(a) a physical system having a physical storage for receiving physical documents;

(b) an electronic system having an electronic storage for receiving electronic documents;

(c) said physical storage and said electronic storage providing pairs of certain of said physical documents and certain of said electronic documents;

(d) corresponding physical documents and electronic documents of said pairs having corresponding visual contents;

(e) corresponding selections of physical documents and electronic documents of said pairs being respectively assigned corresponding date/time physical markings and corresponding date/time electronic addresses;

(f) corresponding physical documents and electronic documents of said pairs having corresponding relational contents;

(g) said corresponding selections of physical documents being physically organized by the logic of their physical markings;

(h) said corresponding selections of electronic documents being electronically organized by the logic of their relational contents.

26. A digital computer system comprising at least an electronic display, at least an electronic storage, and at least a relational database, which is characterized by a grid containing (1) columns of fields, and (2) rows of records:

(a) said grid containing a set of said rows in the form of a succession of records representing a succession of electronic documents;

(b) said electronic documents of said succession of records representing visual contents that can be viewed on said display;

(c) said electronic documents of said succession having a succession of electronic addresses that are characterized by a date/time data type;

(d) said grid containing a set of said columns in the form of a set of fields representing selections of attributes of said electronic documents;

(e) said selection of attributes being characterized by data types other than said date/time data type;

(f) sets of said electronic documents of said successions being indexed according to groupings that are defined by the logic of their date/time addresses;

(g) sets of said electronic attributes of said selections being indexed according to groupings that are defined by the logic of their fields.

27. The digital computer system of claim 26, wherein said electronic documents are e-mail documents.

28. The digital computer system of claim 26, wherein said electronic documents are image documents.

29. The digital computer system of claim 26, wherein said electronic documents are image documents.

30. The digital computer system of claim 26, wherein said electronic documents are work documents.

31. The digital computer system of claim 26, wherein said electronic documents are correspond to photographic documents.

32. The digital computer system of claim 26, wherein said electronic documents are PDF documents.

33. The digital computer system of claim 26, wherein said electronic documents are XML documents.

34. The digital computer system of claim 26, wherein said electronic documents are electronic image documents and electronic work documents.

35. The digital computer system of claim 26, wherein said electronic documents are electro-optically generated electronic documents.

36. The digital computer system of claim 26, wherein said electronic documents are computer generated electronic documents.

37. A digital computer system comprising at least an electronic storage:

(a) said storage containing a set of records representing a succession of electronic documents;

(b) each record of said set of records containing a selection of attributes of said succession of electronic documents;

(c) said electronic documents of said set of records representing visual contents that can be viewed on a display;

(d) said selection of attributes of said electronic documents of said succession of electronic documents containing a succession of unique identifiers that are characterized by a date/time data type;

(e) said succession of unique identifiers constituting a succession of storage addresses;

(f) said selection of attributes of said electronic documents of said succession of electronic documents containing a succession of non-unique identifiers that are not characterized by a date/time data type;

(g) sets of said electronic documents actually being indexed according to groupings of said electronic documents that are defined by the logic of their unique identifiers;

(h) sets of said electronic documents actually being indexed according to groupings of said electronic documents that are defined by the logic of selections of their non-unique identifiers.

38. The digital computer system of claim 37, wherein said electronic documents are e-mail documents.

39. The digital computer system of claim 37, wherein said electronic documents are image documents.

40. The digital computer system of claim 37, wherein said electronic documents are include a stream of image documents.

41. The digital computer system of claim 37, wherein said electronic documents are work documents.

42. The digital computer system of claim 37, wherein said electronic documents correspond to photographic documents.

43. The digital computer system of claim 37, wherein said electronic documents are PDF documents.

44. The digital computer system of claim 37, wherein said electronic documents are XML documents.

45. The digital computer system of claim 37, wherein said electronic documents are electronic image documents and electronic work documents.

46. The digital computer system of claim 37, wherein said electronic documents are electro-optically generated electronic documents.

47. The digital computer system of claim 37, wherein said electronic documents are computer generated electronic documents.

* * * * *